US009624045B2

(12) United States Patent
Wortmann

(10) Patent No.: US 9,624,045 B2
(45) Date of Patent: Apr. 18, 2017

(54) CABLE GATHERING DEVICE (WIRE STACKER)

(71) Applicant: SCHLEUNIGER HOLDING AG, Thun (CH)

(72) Inventor: Thomas Wortmann, Remscheid (DE)

(73) Assignee: Schleuniger Holding AG, Thun (CH)

( * ) Notice: Subject to any disclaimer, the term of this patent is extended or adjusted under 35 U.S.C. 154(b) by 326 days.

(21) Appl. No.: 14/357,226

(22) PCT Filed: Nov. 9, 2012

(86) PCT No.: PCT/IB2012/056305
§ 371 (c)(1),
(2) Date: May 15, 2014

(87) PCT Pub. No.: WO2013/068986
PCT Pub. Date: May 16, 2013

(65) Prior Publication Data
US 2015/0158678 A1 Jun. 11, 2015

(30) Foreign Application Priority Data

Nov. 11, 2011 (CH) ..................................... 1810/11

(51) Int. Cl.
*B65G 57/18* (2006.01)
*H01R 43/28* (2006.01)
*H01R 43/052* (2006.01)

(52) U.S. Cl.
CPC ........... *B65G 57/186* (2013.01); *H01R 43/28* (2013.01); *H01R 43/052* (2013.01)

(58) Field of Classification Search
CPC .............................. B65G 57/186; H01R 43/28
See application file for complete search history.

(56) References Cited

U.S. PATENT DOCUMENTS

| | | |
|---|---|---|
| 831,729 A | 9/1906 | Merry |
| 1,178,566 A | 4/1916 | Wright |
| 1,333,147 A | 3/1920 | Wright |
| 3,198,220 A | 8/1965 | Scamberti |
| 3,540,110 A | 11/1970 | Schwarz |
| 3,839,777 A | 10/1974 | Puzio |
| 4,009,852 A * | 3/1977 | Bulanda ................ F16L 3/1075 24/324 |
| 4,095,497 A | 6/1978 | Radford et al. |
| 4,108,333 A * | 8/1978 | Falk ......................... G07F 9/105 198/817 |
| 4,272,951 A | 6/1981 | Vogelsberg |
| 4,506,566 A | 3/1985 | Schmid |
| 4,655,107 A | 4/1987 | Juergenhake |
| 4,699,414 A | 10/1987 | Jones |
| 4,800,791 A | 1/1989 | Jürgenhake |
| 5,033,785 A | 7/1991 | Wooley, Jr. |
| 5,100,021 A * | 3/1992 | Mussi ..................... B01L 9/543 221/155 |
| 5,222,859 A * | 6/1993 | Gepfert ................ B65G 57/186 198/431 |
| 5,247,732 A | 9/1993 | Lait et al. |
| 5,253,912 A | 10/1993 | Andorlini et al. |
| 5,282,717 A | 2/1994 | Löhr et al. |
| 5,350,101 A | 9/1994 | Godlewski |
| 5,412,855 A | 5/1995 | Koch |
| 5,650,181 A | 7/1997 | Kotaki |
| 5,716,020 A | 2/1998 | Shults |
| 5,816,384 A | 10/1998 | Hsu |
| 5,820,008 A | 10/1998 | College |
| 5,960,622 A | 10/1999 | Koch et al. |
| 6,135,164 A | 10/2000 | Celoudoux et al. |
| 6,167,919 B1 | 1/2001 | Füchsl et al. |
| 6,289,944 B1 | 9/2001 | Frommenwiler |
| 6,401,442 B1 | 6/2002 | Root et al. |
| 6,435,336 B1 | 8/2002 | Knodler |
| 6,490,785 B1 | 12/2002 | Kometani |

(Continued)

FOREIGN PATENT DOCUMENTS

| | | |
|---|---|---|
| CH | 673858 A5 | 4/1990 |
| CN | 201594421 U | 9/2010 |

(Continued)

OTHER PUBLICATIONS

Full English Translation of International Search Report and written opinion, dated Apr. 5, 2013, from parent International appln. PCT/IB2012/056305 published as WO2013/068986A1 on May 16, 2013.
Copending commonly-owned U.S. Appl. No. 12/990,116 entered U.S. national phase Nov. 19, 2010, filed as PCT/IB2009/052125 May 20, 2009 a non-provisional of U.S. Appl. No. 61/117,189, filed Nov. 23, 2008.
International Search Report and Written opinion, dated Apr. 5, 2013, from parent International appln. PCT/IB2012/056305 published as WO2013/068986A1 on May 16, 2013, with partial English transl.
Copending commonly-owned U.S. Appl. No. 14/273,020, filed May 8, 2014.
Copending commonly-owned U.S. Appl. No. 14/357,222 entered U.S. national phase May 11, 2014.

(Continued)

*Primary Examiner* — Shaun R Hurley
(74) *Attorney, Agent, or Firm* — Davis & Bujold PLLC; Michael J. Bujold

(57) ABSTRACT

The invention relates to a cable gathering device (wire stacker) (12) for processing electrical or optical lines (8), such as wires, cables, line bundles, optical fibers etc. comprising a platform (2) which can be tilted downwards which has an accommodating region (2a) for accommodating one or more lines (8) after a processing step, characterized in that the platform (2) has a removal region (2b) adjoining the accommodating region (2a), wherein lines (8) located in the accommodating region (2a) can be brought into the removal region (2b) by tilting the platform (2) downwards, from which the lines (8) can be removed and wherein the lines (8) are retained in the removal region (2b) by retaining means (2d) in the tilted position of the platform (2).

19 Claims, 3 Drawing Sheets

(56) References Cited

U.S. PATENT DOCUMENTS

| | | | |
|---|---|---|---|
| 6,662,987 | B2 | 12/2003 | Erni |
| 6,702,099 | B2 | 3/2004 | Otaguro et al. |
| 6,735,933 | B2 | 5/2004 | Abba et al. |
| 6,948,675 | B2 | 9/2005 | Frommenwiler |
| 6,999,847 | B2 | 2/2006 | Barry et al. |
| 7,021,510 | B2 | 4/2006 | Ellingson |
| 7,043,825 | B2 | 5/2006 | Conte |
| 7,178,708 | B2 | 2/2007 | Grinsted |
| 7,647,759 | B2 | 1/2010 | Braun et al. |
| 8,113,557 | B2 | 2/2012 | Kirst et al. |
| 8,234,850 | B1 | 8/2012 | Wright |
| 8,573,656 | B1 | 11/2013 | Zhang et al. |
| 8,646,822 | B2 | 2/2014 | Braun et al. |
| 9,078,479 | B2 | 7/2015 | Wright |
| 2005/0050713 | A1 | 3/2005 | Locher et al. |
| 2005/0132853 | A1* | 6/2005 | Hattersley, Jr. .......... B21C 47/14 83/13 |
| 2006/0263194 | A1* | 11/2006 | Ahlers ................ B65G 57/186 414/793 |
| 2009/0241314 | A1 | 10/2009 | Watanabe |
| 2011/0049211 | A1 | 3/2011 | Schütz et al. |
| 2014/0352867 | A1 | 12/2014 | McClane et al. |

FOREIGN PATENT DOCUMENTS

| | | |
|---|---|---|
| DE | 3630359 A1 | 3/1988 |
| DE | 4104597 A1 | 10/1991 |
| DE | 19624973 A1 | 1/1998 |
| DE | 19631770 A1 | 2/1998 |
| DE | 19844416 A1 | 4/1999 |
| DE | 10107670 A1 | 9/2002 |
| DE | 102010017981 A1 | 10/2010 |
| EP | 0303724 A1 | 2/1989 |
| EP | 0598276 A1 | 5/1994 |
| EP | 0708050 A1 | 4/1996 |
| EP | 0788200 A2 | 8/1997 |
| EP | 0984530 A1 | 3/2000 |
| EP | 1009074 A2 | 6/2000 |
| EP | 1032095 A2 | 8/2000 |
| EP | 1213800 A1 | 6/2002 |
| EP | 1387449 A1 | 2/2004 |
| EP | 0889486 B1 | 8/2004 |
| EP | 1447888 A1 | 8/2004 |
| EP | 1691457 A1 | 8/2006 |
| EP | 1032095 A3 | 5/2008 |
| GB | 868532 A | 5/1961 |
| JP | 2004-071237 A | 3/2004 |
| WO | 93/06320 A1 | 4/1993 |
| WO | 2009/141794 A2 | 11/2009 |
| WO | 2011/055336 A1 | 5/2011 |
| WO | 2012/015057 A2 | 2/2012 |
| WO | 2013/068981 A1 | 5/2013 |
| WO | 2013/068984 A1 | 5/2013 |
| WO | 2013/068988 A1 | 5/2013 |
| WO | 2013/068990 A1 | 5/2013 |
| WO | 2013/068998 A1 | 5/2013 |

OTHER PUBLICATIONS

Copending commonly-owned U.S. Appl. No. 14/357,248 entered U.S. national phase May 11, 2014.
Copending commonly-owned U.S. Appl. No. 14/357,264 entered U.S. national phase May 11, 2014.

\* cited by examiner

CABLE GATHERING DEVICE (WIRE STACKER)

CROSS-REFERENCE TO RELATED APPLICATIONS

This application is a 35 U.S.C. 371 national-phase entry of PCT International application no. PCT/IB2012/056305 filed on Nov. 9, 2012 and also claims benefit of priority to prior Swiss national application no. CH-01810/11 filed on Nov. 11, 2011, and parent PCT International application no. PCT/IB2012/056305 is expressly incorporated herein by reference, in its entirely, for all intents and purposes, as if identically set forth in full herein.

BACKGROUND

The invention relates to cable gathering apparatus for processing electrical or optical lines, such as wires, cables, line bundles, optical fibres, etc., including a platform that can be tilted downwards and that has an accommodating region for accommodating one or more lines after a processing step.

Cable processing devices are known in the prior art in which ready assembled cables are placed on a temporary tray of a cable gathering device (wire stacker) or discharged thereon and gathered there. When a certain number of cables are gathered on the temporary receptacle, the tray is tilted downwards so that the cables slip downwards from the tray in order to land in a container provided specifically for this purpose (removal trough) where they are accessible from outside the cable processing device.

The disadvantage of such a construction is that as a result of the cable dropping downwards from the temporary tray into a separate removal trough, the cable enters into a region that can ergonomically only be reached for an operator with some effort and continuously stooping, that is, in the region close to the floor. However, a corresponding height stacking of the tilting tray and the removal trough disposed thereunder requires construction expenditure.

U.S. Pat. No. 3,839,777A discloses such an apparatus. A wire guide assembly comprises a pivotable trough-like receptacle for wire bundles where the wire bundles can be released by tilting the receptacle downwards. The centre of gravity of the receptacle is in this case shifted outwards in such a manner that the receptacle can already tilt downwards merely due to the action of gravity.

SUMMARY

It is within the scope of the present disclosure to provide cable gathering apparatus (wire stacker) that does not have the aforementioned disadvantages, and that enables an ergonomically matched removal of the lines. At the same time, it has a space-saving and user-friendly design, and it manages with simple process steps. Simultaneously, a high degree of safety should be ensured for the operator who removes the cable.

This may be solved with a cable gathering device (wire stacker) of the type mentioned initially, wherein the platform has a removal region adjoining the accommodating (receiving) region, wherein lines located in the accommodating region can be brought into the removal region by tilting the platform downwards. From the removal region the lines can be removed, and in the tilted position of the platform, the lines are retained via retainer in the removal region.

As a result of the fact that the tiltable platform has its own accommodating (receiving) region and its own removal region, the process region of the cable gathering device (wire stacker) can be spatially separated from the removal region, whereby a high safety standard is provided. The additional retainer in the removal region prevents the lines from falling down from the platform during tilting of the platform. The lines are therefore held reliably in the removal region. A subsequent upwards pivoting of the platform then has the effect that the lines retained in the removal region return to a height at which the lines are optimally accessible, from the ergonomic aspect, from outside the cable gathering device (wire stacker). A further advantage according to the present disclosure lies in that the processing process need not be stopped during removal of the lines from the removal region. This is ensured by the separate accommodating and removal regions.

According to the present disclosure, there is a low expenditure on apparatus. A separate removal trough, as in the prior art, is not necessary, with the result that the number of parts and the costs are reduced. The areas of application are numerous. The platform may thus serve as a tray for line twisters after the twisting process, but may also be used in connection with a conveyor belt. Thus, a platform according to the disclosure may be used in insulating machines, crimping devices, twisting devices, etc.

The present disclosure allows a removal of finished lines from a cable processing machine at ergonomic height. At the same time, production may still take place automatically behind a protective hood and the finished product discharged onto the same platform in the accommodating region. Any endangerment of the operator by the processing process may be efficiently prevented by the formation of a protective hood and the platform (separate accommodating region).

In one version, a retainer is fastened to the platform, giving a particularly compact and simple design.

In one version, a platform forms the base of a tray. In the tray, the lines are protected from an undesired falling down by side walls.

In one version, a retainer is formed by a side wall of the tray. The side wall of the tray therefore serves at the same time to limit the downward sliding of the lines in the tilted state of the platform, and to retain the lines in the removal region.

In one version, a platform is pivotable about a substantially horizontal axis of rotation. A particularly simple realisation of the tilting movement may thus be achieved. The axis of rotation is substantially parallel to the longitudinal extension of the platform into which the lines enter according to their length.

In one version, an axis of rotation is provided in the region of the underside of the accommodating region. As a result, no parts of the platform or tray enter into the process region of the cable gathering device (wire stacker) during the tilting process.

In one version, an actuator is provided for tilting the platform, which actuator acts in the region of the underside of the removal region, wherein preferably the actuator is a pneumatic actuator. This measure is preferably a space-saving design.

In one version, a cable gathering device (wire stacker) has a preferably transparent partition wall that separates a process region from an operating region and projects from above in the direction of the platform, whereby the safety of an operator is reliably and permanently ensured.

In one version, a partition wall extends at least partially into the tray between accommodating region and removal region, whereby safety is further increased.

In one version, in the removal region, the base of the platform has a recess in order to better retain the lines in position there. During the upwards pivoting of the platform with the lines located in the removal region, the recess prevents the outermost lines of the line bundle from rolling back into the adjoining receiving region.

In one version, a platform is substantially flat in the accommodating region, with the result that the sliding of the lines into the removal region is facilitated.

In one version, a cable gathering device (wire stacker) is a cable twisting apparatus, and a platform is provided to accommodate the twisted cable.

The present disclosure also relates to a method for removal of electrical or optical lines (8), such as wires, cables, line bundles, optical fibres, etc., from a cable gathering device (wire stacker) including: a platform that can be tilted downwards and that has an accommodating region for accommodating one or more lines after a processing step, wherein the platform has a removal region adjoining the accommodating region, wherein lines located in the accommodating region can be brought into the removal region by tilting the tray downwards and are retained in the removal region by retainer in the tilted position of the platform; and that the lines are removed from the removal region.

In one version, before removal of the lines from the removal region, the platform is tilted upwards again. As a result, the lines are raised to an ergonomically optimal height for removal while at the same time lines can be fabricated and discharged in the process region and in the accommodating region.

Further exemplary versions according to the present disclosure are indicated by the remaining disclosure and the drawings figures. The appended list of reference labels is part of the disclosure.

BRIEF DESCRIPTION OF THE DRAWINGS

Exemplary versions are explained in detail symbolically and via examples in reference to figures. In the figures.

DETAILED DESCRIPTION

Figure 1:
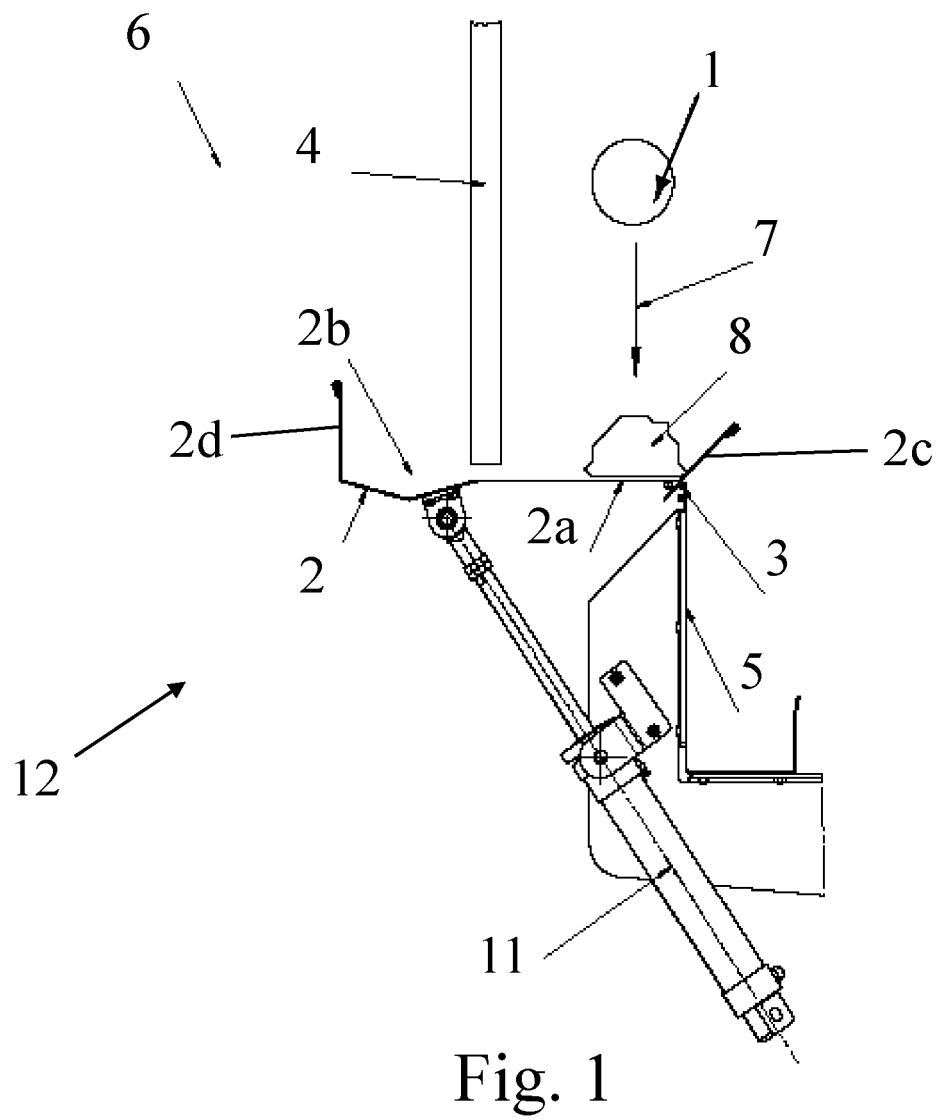
FIG. 1 depicts a cable gathering device (wire stacker) with a tiltable platform disposed below the processing region.

FIG. 1 shows a cable gathering device (wire stacker) 12 for processing electrical or optical lines 8. The processing or process region 1 in which the lines 8 are processed, for example, insulated, crimped, twisted, bundled, etc., is depicted schematically only by a circle. If the lines 8 are ready configured after a processing step, they arrive at the accommodating region 2a of a platform 2 (e.g., are discharged onto this). The direction of drop 7 from the process region 1 onto the accommodating region 2a of the platform 2 is depicted by means of an arrow. The lines 8 are thereby received by the platform 2 according to their length. The lines 8 in this case come to lie substantially parallel to the longitudinal extension of the platform 2. Accordingly, in the figures, the lines 8 extend substantially perpendicular to the plane of the sheet.

The platform 2 is mounted on a machine frame 5 and can be tilted downwards. For this, it is pivotable about a substantially horizontal axis of rotation 3. The actuation of an actuator 11 cooperating with the platform 2 enables the tilting process downwards, and the pivoting back again upwards. In the depicted exemplary version shown the actuator 11 is a pneumatically actuatable piston-cylinder unit that is disposed below the platform 2. The extension of the piston rod thereby acts in the region of the underside of the removal region 2b via a substantially horizontal axis of rotation.

The platform 2, in the exemplary version shown, forms the base of a tray. Platform 2 has a removal region 2b in addition to the receiving region 2a. During tilting of the platform 2 downwards, the lines 8 placed in the accommodating region 2a slide towards the removal region 2b.

Figure 2:
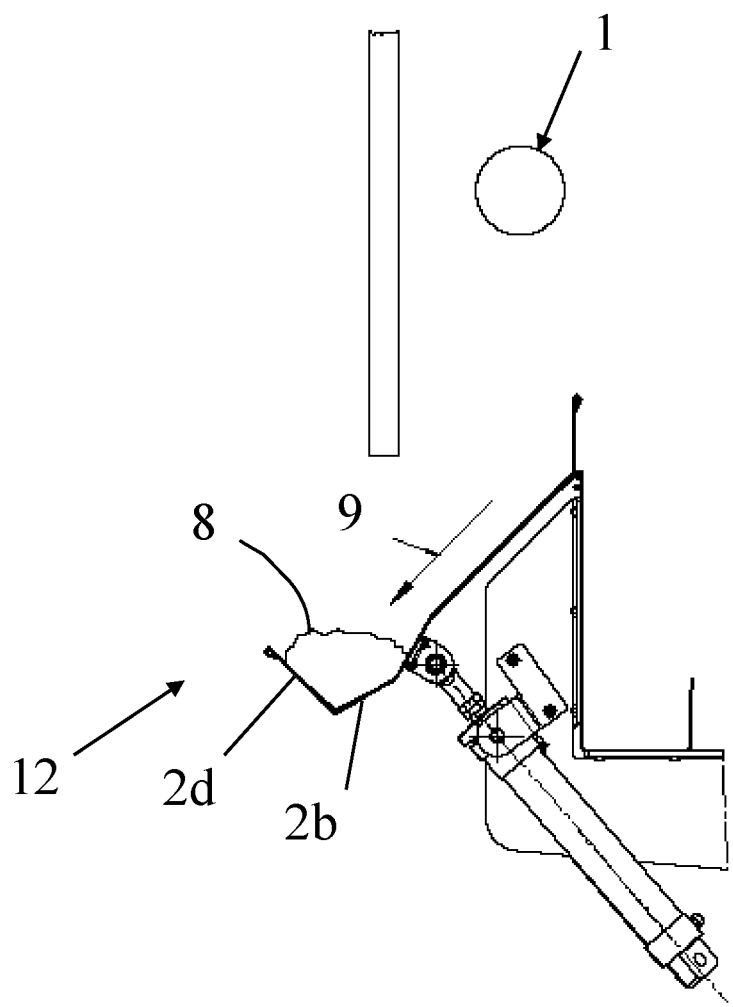
FIG. 2 depicts a device according to FIG. 1 with the platform in the tilted state, and, FIG. 3 depicts a device according to FIG. 1 with the platform pivoted upwards again for removal of lines from the removal region.

FIG. 2 shows the platform 2 in the tilted state. Here, the lines 8 have already slipped into the removal region 2b. The sliding direction 9 here indicates the direction of movement of the lines 8.

In the exemplary version depicted, the platform 2 forms the base of a tray. The left-hand side wall 2d of the tray delimits the movement of the lines 8 during the tilting of the platform 2 and retains the lines 8 in the removal region 2b as a retainer 2d. In principle (alternatively to a side wall), other retainers are also feasible to retain the lines 8, particularly in the tilted state of the platform 2. A grid, or upwardly projecting rods that are disposed at certain distances on the platform 2, for example, would also be possible as retaining structure. In a variant the retaining structure includes a stationary retainer that is not fastened to the platform 2, for example, a retainer that has a curved contour that defines the outermost edge of the removal region during tilting.

FIG. 3 again depicts the platform in the upwardly pivoted state, where the lines 8 that had previously slipped (FIG. 2) into the removal region 2b now remain in the removal region 2b. This is preferably promoted by a recess in the platform 2 in the removal region 2b. While the lines 8 can now be removed from the removal region 2b, as indicated schematically by the removal direction 10, newly processed lines 8 are already arriving from the process region 1 onto the accommodating region 2a.

Preferably, partition wall 4 (FIG. 1) that simultaneously delimits the accommodating region 2a from the removal region 2b is located between the process region 1 and the operating region 6 where the lines 8 can be removed, for example by an operator. In order that the operator can monitor the process region 1, the partition wall is preferably transparent, for example made of transparent acrylic plastic such as methyl methacrylate polymer. The partition wall 4 may, for example, be a part of a protective hood that is pivotable as a whole in order to make the process region 1 accessible from outside during cleaning, repair, and/or maintenance.

The platform 2 is preferably fabricated over its entire surface, for example of sheet metal. However, the platform may also be formed as a grid, or from individual interconnected struts. It must merely be able to accommodate the lines 8. In principle, the platform 2 may have any shape. In a preferred version it forms the base of a tray. The side walls 2c, 2d of the tray reliably prevent lines 8 from undesirably falling from platform 2.

Naturally, actuator 11 that accomplishes the tilting of the platform 2 could also be a motor or another drive. This actuator 11 may also act directly or indirectly on the platform at a different position from that depicted in FIGS. 1-3.

An exemplary method is explained in detail hereinafter with reference to the individual figures:

FIG. 1: below the process region 1 the tilting tray 2 is connected to the machine frame 5 via the axis of rotation 3. The tilting tray may be folded downwards (preferably by about 45°) starting from the horizontal by means of a pneumatic drive 11. Line products are formed in the process region 1, dropping down after completion or after a process step (discharge direction 7). These line products form the line bundle 8.

FIG. 2: when a batch is processed, the platform 2 pivots downwards (in the preferred exemplary version by about 45°). Consequently, the line bundle 8 thereby slips, due to gravity, into the removal region 2b that is preferably characterised by a recess or depression.

Figure 3:
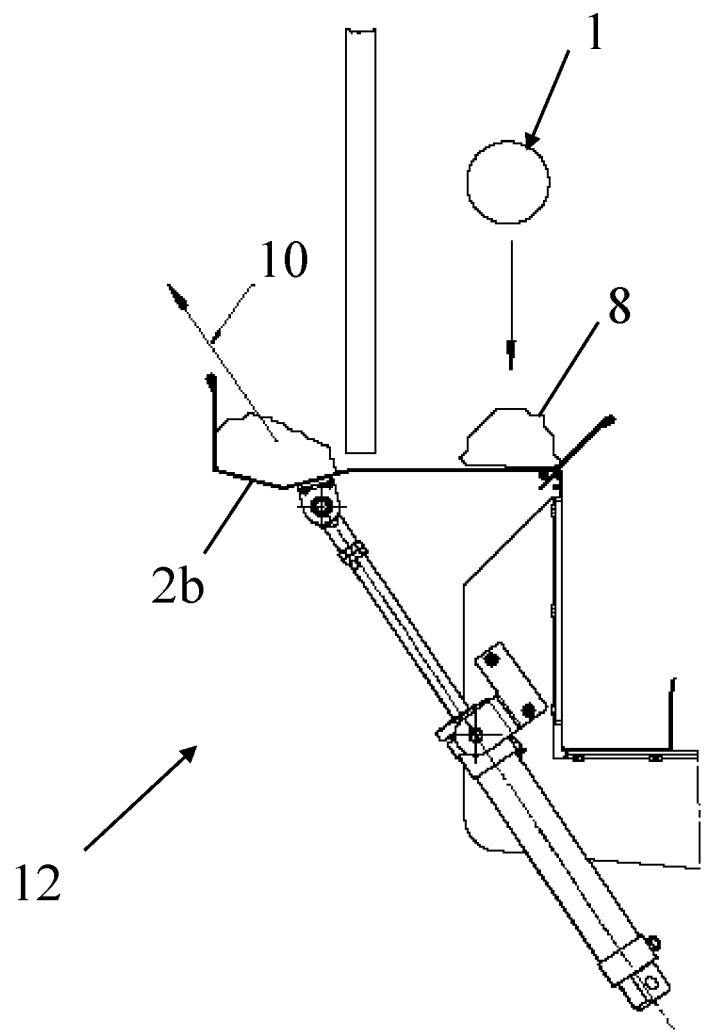

FIG. 3: After a brief interval the platform 2 pivots back into the (substantially horizontal) initial position where the lines 8 are again raised but remain in the removal region 2b. The line bundle 8 may then be simply removed (direction 10) from the operating region 6. The cable gathering device (wire stacker) 12 may continue during this removal to discharge lines 8 from the process region 1 onto the tiltable platform 2. Thus, it is not necessary to interrupt the processing process during the removal of the lines from the removal region 2b.

The disclosures of the following commonly owned applications: published PCT application no. WO 2013/068981 A1 published May 16, 2013; published PCT application no. WO 2013/068984A1 published May 16, 2013 and nationalized in the U.S. as U.S. application Ser. No. 14/357,222; published PCT application no. WO 2013/068988A1 published May 16, 2013 and nationalized in the U.S. as U.S. application Ser. No. 14/357,248; and, published PCT application no. WO 2013/068990A1 published May 16, 2013 and nationalized in the U.S. as U.S. application Ser. No. 14/357,264; (Internal file references of the Common Applicant respectively being: S124PWO, S125PWO, S127PWO, S141PWO), which were all deposited at the International Bureau (IB) on Nov. 9, 2012, form an integral component of the present application and should be seen in combination with the same since these separate applications each relate to different aspects of the same machine. Further synergistic effects result from this.

LIST OF REFERENCE LABELS

1—Process region
2—Platform
2a—Accommodating region
2b—Removal region
2c—Side wall
2d—Side wall, retainer
3—Axis of rotation
4—Partition wall
5—Machine frame
6—Operating region
7—Discharge direction
8—Lines
9—Sliding direction
10—Removal
11—Actuator
12—Cable gathering apparatus (wire stacker)

What is claimed is:
1. A cable gathering apparatus comprising:
a tiltable platform, said tiltable platform having a line receiving region, said tiltable platform having a line removal region;
a partition wall situated to control line movement from said line receiving region into said line removal region, said partition wall projecting from above said tiltable platform in a direction towards said platform to delineate a boundary between said receiving region and said removal region;
an actuator operatively connected to controllably tilt said tiltable platform to transfer lines from said receiving region into said removal region; and,
a retainer configured to hold lines in said line removal region when said tiltable platform is tilted comprising a tray that has its base formed by said tiltable platform.

2. A cable gathering apparatus as claimed in claim 1, further comprising:
a tray that has its base formed by said tiltable platform.

3. A cable gathering apparatus as claimed in claim 2, further comprising:
a side wall of said tray forming said retainer.

4. The cable gathering apparatus as claimed in claim 2 wherein:
said partition wall extends at least partially into said tray between said receiving region and said removal region.

5. A cable gathering apparatus as claimed in claim 1, further comprising:
an underside of said line removal region, said actuator acting on said underside.

6. The cable gathering apparatus as claimed in claim 1, wherein:
there is an axis of rotation for said tiltable platform, said axis of rotation being located under said receiving region.

7. A cable gathering apparatus as claimed in claim 1, further comprising:
a recess in said tiltable platform, said recess being located in said removal region.

8. A cable gathering apparatus comprising:
a tiltable platform, said tiltable platform having a line receiving region, said tiltable platform having a line removal region;
a partition situated to control line movement from said line receiving region to said line removal region;
an actuator operatively connected to controllably tilt said tiltable platform to transfer lines from said receiving region past said partition into said removal region; and
there is an axis of rotation for said tiltable platform, said axis of rotation being located under said receiving region.

9. A cable gathering apparatus as claimed in claim 8, further comprising:
a retainer configured to hold lines in said line removal region when said tiltable platform is tilted.

10. The cable gathering apparatus as claimed in claim 8, wherein:
said partition is a wall projecting from above said tiltable platform in a direction towards said platform.

11. A cable gathering apparatus as claimed in claim 8, further comprising:
a tray that has its base formed by said tiltable platform.

12. A cable gathering apparatus as claimed in claim 11, further comprising:
a retainer configured to hold lines in said line removal region when said tiltable platform is tilted, said retainer being formed by a side wall of said tray.

13. A cable gathering apparatus as claimed in claim 12, further comprising:
a second side wall of said tray being situated to prevent lines from falling from said receiving region.

14. The cable gathering apparatus as claimed in claim 11, wherein:
said partition is a wall projecting from above said tiltable platform in a direction towards said platform and extending at least partially into said tray between said receiving region and said removal region.

15. A cable gathering apparatus as claimed in claim 8, further comprising:
an underside of said line removal region, said actuator acting on said underside.

16. A cable gathering apparatus as claimed in claim 8, further comprising:
a recess in said tiltable platform, said recess being located in said removal region.

17. A cable handling process comprising the steps of:
depositing lines on a receiving region of a tiltable platform;
employing a partition to prevent the lines deposited on the receiving region from passing to a removal region of the tiltable platform;
controllably pivoting the tiltable platform to pass lines deposited on the receiving region from the receiving region to the removal region beyond the partition; and,
retaining lines passed to the removal region.

18. A cable handling process as claimed in claim 17, further comprising the step of:
further pivoting the tiltable platform with the lines situated within the removal region.

19. A cable handling process as claimed in claim 18, further comprising the step of:
during said step of further pivoting the tiltable platform, retaining lines in the removal region with a recess located in said removal region.

* * * * *